United States Patent
McGowan (10) Patent No.: US 8,081,234 B2
(45) Date of Patent: Dec. 20, 2011

(54) TECHNIQUE FOR INCREASED EXPOSURE RANGE IN IMAGE SENSORS

(75) Inventor: Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1165 days.

(21) Appl. No.: 11/025,688

(22) Filed: Dec. 29, 2004

(65) Prior Publication Data

US 2006/0139470 A1    Jun. 29, 2006

(51) Int. Cl.
*H04N 9/73* (2006.01)

(52) U.S. Cl. ........... 348/223.1; 348/222.1; 348/229.1; 348/362

(58) Field of Classification Search ........... 348/222.1, 348/223.1, 229.1, 362, 294–324
See application file for complete search history.

(56) References Cited

U.S. PATENT DOCUMENTS

| | | | |
|---|---|---|---|
| 4,709,259 A * | 11/1987 | Suzuki | 348/280 |
| 4,831,453 A | 5/1989 | Takemura | |
| 5,272,535 A | 12/1993 | Elabd | |
| 5,754,229 A | 5/1998 | Elabd | |
| 5,796,433 A | 8/1998 | Dyck | |
| 5,841,126 A | 11/1998 | Fossum et al. | |
| 6,661,451 B1 * | 12/2003 | Kijima et al. | 348/220.1 |
| 2001/0028397 A1 * | 10/2001 | Nakamura | 348/222 |
| 2004/0041927 A1 | 3/2004 | Cho et al. | |
| 2004/0051792 A1 | 3/2004 | Oda et al. | |
| 2004/0096124 A1 | 5/2004 | Nakamura | |
| 2004/0096142 A1 | 5/2004 | Noe et al. | |
| 2004/0169747 A1 * | 9/2004 | Ono et al. | 348/272 |
| 2004/0178466 A1 * | 9/2004 | Merrill et al. | 257/440 |
| 2004/0239798 A1 | 12/2004 | Nayar et al. | |
| 2005/0045980 A1 | 3/2005 | Guidash | |
| 2006/0007498 A1 * | 1/2006 | McDermott | 358/296 |

FOREIGN PATENT DOCUMENTS

| | | |
|---|---|---|
| EP | 0913869 A2 | 5/1999 |
| WO | 2006/072098 A1 | 7/2006 |

OTHER PUBLICATIONS

International Search Report for corresponding PCT Application No. PCT/US2005/047678, (Apr. 28, 2006), 4 pgs.
Mokhoff, N., "Computing Graphics Spotlight Shines on Microsoft", *EE Times*, (Aug. 13, 2004), 3 pgs.
Petschnigg, G., et al., "Digital Photography With Flash and No-Flash Image Pairs", *ACM Transactions on Graphics, Proceedings of SIG-GRAPH 2004*, http://research.microsoft.com/projects/flashnoflash/, (observed Dec. 29, 2004), 11 pgs.
200580045399.4, "China Application No. 200580045399.4 Office Action Mailed May 8, 2009", 19 pages.
Office Action received for Chinese Patent Application No. 200580045399.4 mailed on Jan. 6, 2011, 13 pages of Office Action including English Translation.

* cited by examiner

*Primary Examiner* — Yogesh Aggarwal
(74) *Attorney, Agent, or Firm* — Trop, Pruner & Hu, P.C.

(57) ABSTRACT

An apparatus comprising an image sensor and a control logic circuit. The image sensor includes at least a first pixel array and a second pixel array, wherein at least some of the pixels of the first pixel array are interspersed over an image sensing area with pixels of the second pixel array. The control logic circuit is operable to control durations of exposure of the first pixel array and the second pixel array independently.

33 Claims, 6 Drawing Sheets

TECHNIQUE FOR INCREASED EXPOSURE RANGE IN IMAGE SENSORS

BACKGROUND

A standard digital image sensor is a homogenous array of light sensitive cells called pixels. The pixels can include either charge coupled devices (CCD) or complimentary metal oxide semiconductor (CMOS) devices. The individual pixels are monochrome and only detect light, not color. To provide color images, the monochrome pixels are covered with color filters. Typically filters that pass red, green, and blue light are arranged on a cluster of pixels. Color for each pixel cluster is then determined using a coding scheme such as Bayer encoding. Digital camera image sensors do not have a mechanical shutter, but use an "electronic shutter." Photons incident to the pixels create charge on the pixels. The brighter the light that is incident to a pixel, the more charge that accumulates on the pixel. This charge results in a voltage on the pixel that can be sampled and quantized. The brightness of the resulting image is related to the voltage sampled on the pixel. An electronic shutter clears the charge from all the pixels in the array. The exposure time of the image sensor is the time from the clearing of the array to the sampling of it.

Image sensors are designed to use the linear range of pixel devices such that the voltage response of the devices is proportional to the amount of light incident to the devices for the dynamic range of the pixel devices. The human eye has a very wide dynamic range. In a high contrast scene, the human eye can see detail in the dark and the light areas of the scene. The dynamic range of a digital image sensor is more limited. For a high contrast scene, the image captured by the sensor may have the brighter details overexposed or washed out because incident light caused the pixels to exceed the upper end of their dynamic range, or the image may have the darker details underexposed because the light incident to the pixel did not reach the lower end of their dynamic range.

For a high contrast scene, the camera user is forced to choose to capture either the detail in dark areas of the scene and leave the light areas over-exposed, or to choose to capture the detail in the light areas of the scene and leave the dark areas under-exposed.

DETAILED DESCRIPTION

In the following detailed description, reference is made to the accompanying drawings which form a part hereof, and in which is shown by way of illustration specific embodiments in which the invention may be practiced. It is to be understood that other embodiments may be used and structural and logical changes may be made without departing from the scope of the present invention.

This document describes systems and methods to improve the range of exposure for image sensors. As discussed previously for high contrast scenes, the dynamic range of a standard image sensor forces a camera user to choose to capture either the detail in dark areas or to choose to capture the detail in the light areas of the scene. A common technique in film photography is to improve the range of exposure of an image by "bracketing" an image. Bracketing an image involves taking multiple exposures of the image. Usually three exposures are taken in quick succession. One picture is exposed with the default exposure settings suggested by the camera's exposure control circuits. Two additional exposures are taken of the image; one with a longer exposure than the default settings, and one with a shorter exposure than the default settings. The photographer then either chooses the most satisfactory exposure of the three, or uses darkroom techniques to blend a combination of the three exposures into one optimized image.

Figure 1A:
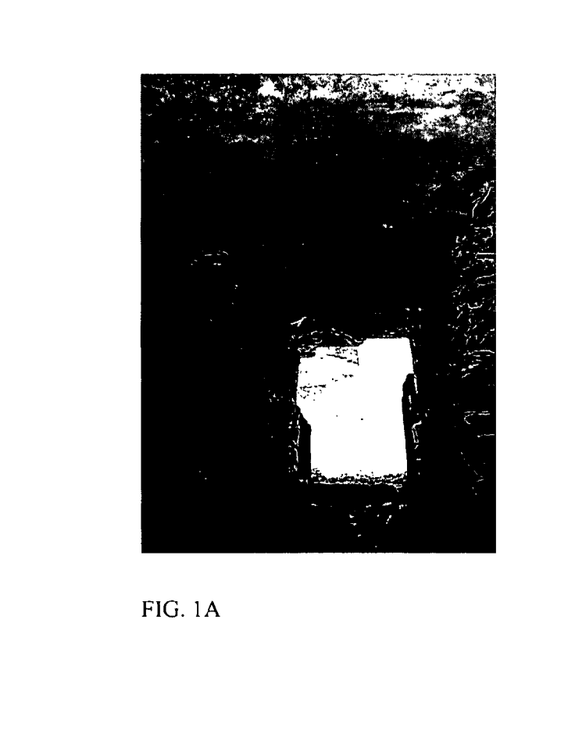
FIGS. 1A-1C shows different exposures of a scene.
Figure 1B:
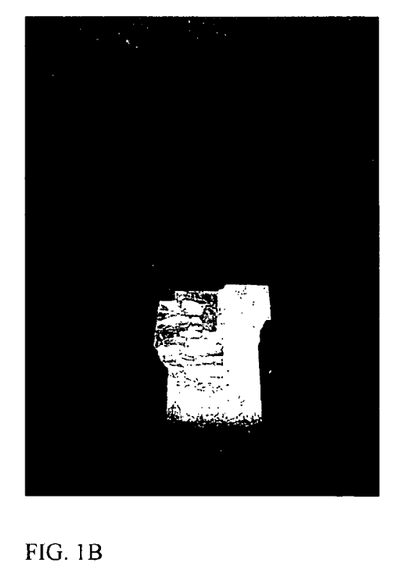
Figure 1C:
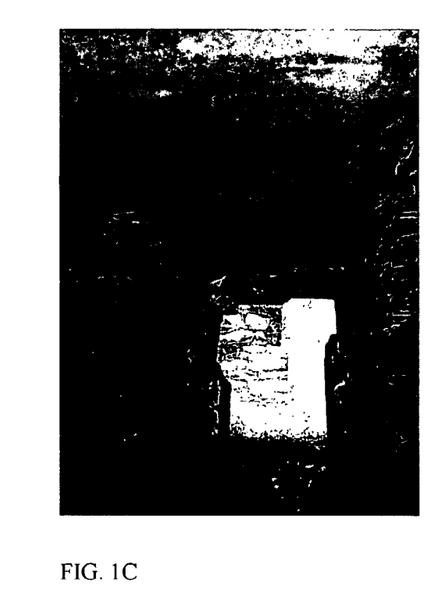

Using a camera with a digital image sensor, the image blending can be done on a computer using software. FIGS. 1A and 1B show two different exposures of the same scene taken with a digital camera. FIG. 1A captures lowlight details of the scene (note that the highlight areas are overexposed and washed out). FIG. 1B captures the highlight details of the scene (note that the lowlight areas are underexposed and the details are lost in the darkness). FIG. 1C is a software-combined image that merges the best parts of the two exposures in FIGS. 1A, 1B. The combined image better represents the scene that the user actually sees by preserving details of the image in both the highlight and lowlight areas.

One problem with capturing multiple images is that the camera moves in the hands of the photographer. To capture the multiple images, it is necessary to mount the camera on a tripod to ensure that the image is captured identically from one image to the next. A second problem arises when a scene or a subject to be captured contains elements that are moving. In such cases, it is highly unlikely that a photographer will capture multiple images that are identical to each other. This complicates or eliminates the possibility of blending images of the scene.

Image sensors contain ever increasing pixel densities. At some point, continuing to increase the pixel density of an image sensor provides less value to the user. The density may exceed what is usable by a printer or computer monitor. For example, a twelve Megapixel image sensor provides an image comprised of 4048 by 3040 pixels.

Most of this resolution is not used when displaying the image on a 1024 by 748 computer monitor. A standard digital image sensor is a homogenous array of pixels. An electronic shutter clears charge from all the pixels at the same time and samples the pixels at the same time. To improve the range of exposure for image sensors and to alleviate the problems involved with taking multiple exposures of images, an image sensor is provided that includes a plurality of pixel arrays. The electronic shutter can expose the arrays differently from each other to create multiple images of the same scene or subject with different exposures. Because the multiple images can be captured at substantially the same time, problems from motion of the photographer and problems caused by movement in the scene or movement by the subject are minimized.

Figure 2:
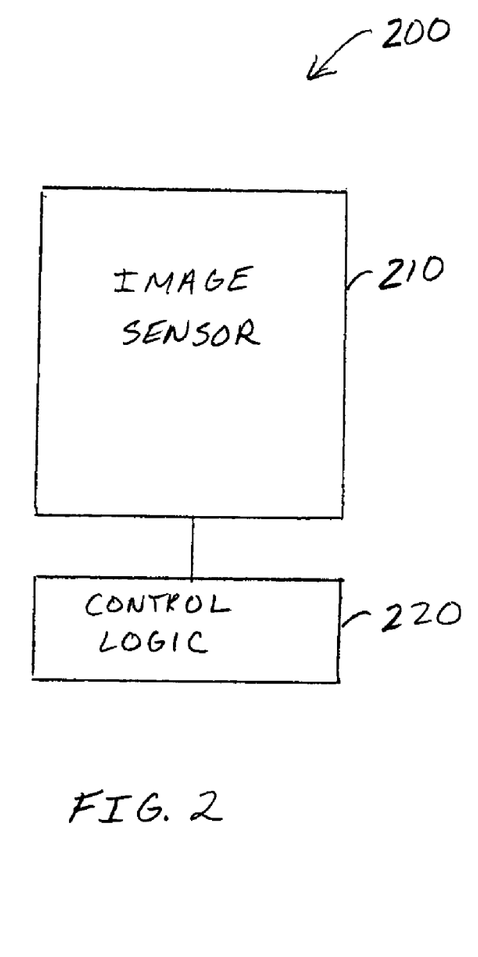
FIG. 2 shows a block diagram of portions of an embodiment of an apparatus for improving the exposure range of image sensors.

FIG. 2 shows a block diagram of portions of an embodiment of an apparatus 200 that has an image sensor 210 and a control logic circuit 220. The image sensor 210 has a plurality of pixel arrays including at least a first pixel array and a second pixel array. At least some of the pixels of the first pixel array are interspersed over an image sensing area with pixels of the second pixel array.

Figure 3A:
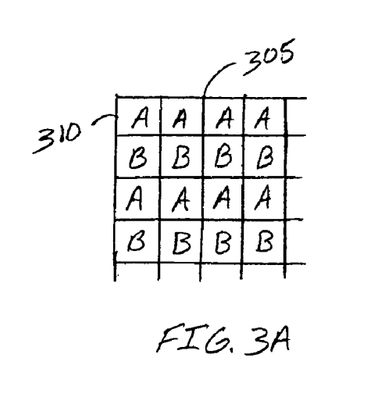
FIGS. 3A-E show block diagram representations of portions of image sensors.
Figures 3B, 3C:
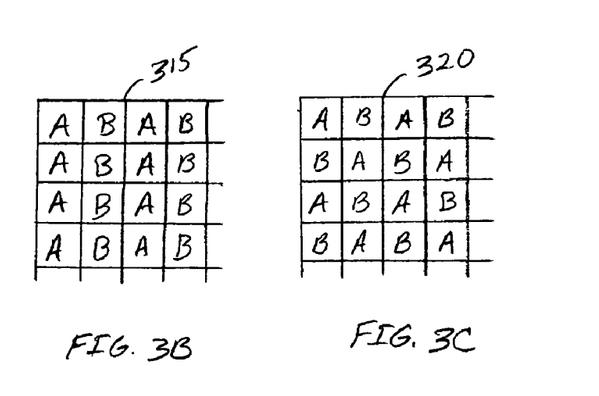

FIGS. 3A-D show block diagram representations of portions of image sensors 300 with pixels of the first pixel array interspersed in alternating arrangements over an image sensing area with pixels of a second pixel array. In the representations, elements of the first pixel array are labeled "A" and elements of the second pixel array are labeled "B." FIG. 3A shows an embodiment of an image sensor 305 where the pixels 310 of the first pixel array and the second pixel array alternate by rows. FIG. 3B shows an embodiment of an image sensor 315 where the pixels of the arrays alternate by column. FIG. 3C shows an embodiment of an image sensor 320 where the pixels of the arrays are interspersed on the image sensor in a checkerboard arrangement. The pixel arrays do not have to be arranged in square arrays. The arrays could be arranged in any shapes, such as hexagons or triangles for example.

Figure 3D:
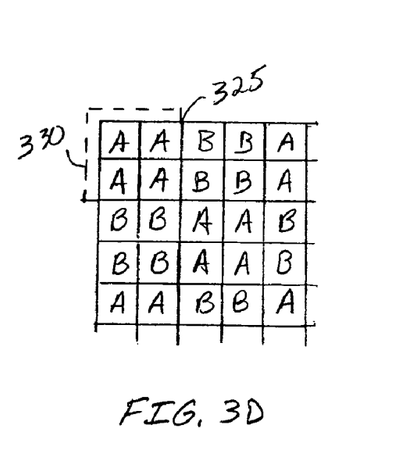

FIG. 3D shows portions of an embodiment of an image sensor 325 where clusters of pixels 330 are interspersed on the image sensor 325 in a checkerboard arrangement. The clusters shown in FIG. 3D have individual pixels arranged in squares, but other geometric arrangements are within contemplation of this document. Embodiments with clusters are useful to provide color images. The clusters 330 are covered with color filters. In one embodiment, pixels in each cluster are covered with filters that pass red, green, or blue light. Color for each pixel cluster is then determined using a coding scheme. In one example, the encoding scheme used is Bayer encoding.

Because the pixels are interspersed, the pixel arrays capture substantially the same image if the pixel arrays are identically exposed, and capture substantially the same image if the exposures occur close in time to each other. However, the advantage of an image sensor with multiple pixel arrays is that the exposure of each pixel array can be made to be different from the others. The control logic circuit 220 in FIG. 2 controls the exposure of the first pixel array and the exposure of the second pixel array. In some embodiments, the control logic circuit 220 includes hardware circuits. In some embodiments, the control logic circuit 220 includes a microprocessor executing instructions in software or firmware. In some embodiments, the control logic circuit 220 includes combinations of hardware, software, or firmware. Controlling exposure refers to determining a period of time, or a duration, that the pixel arrays are exposed to the image, beginning with an electronic shutter clearing charge on the pixels and ending with the sampling of charge on the pixels. Controlling exposure also refers to determining a time when the exposure of each pixel array begins, including commencing a particular array exposures in relation to other array exposures.

Figure 4A:
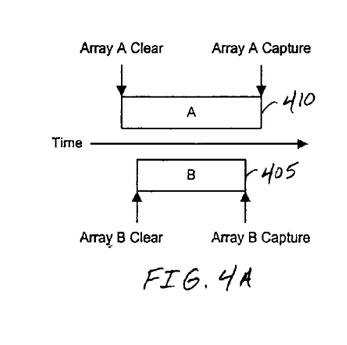
FIGS. 4A-E show timing diagrams representing exposure durations for pixel arrays.
Figure 4B:
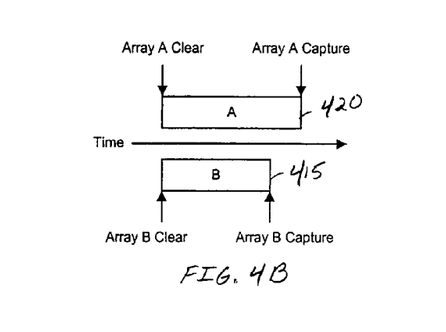

FIGS. 4A-D show timing diagrams 400 representing exposure durations for two pixel arrays, array "A" and array "B." An exposure begins when charge from the arrays is cleared, and an exposure ends when the charge is sampled or captured. The exposure duration is the elapsed time between the time when the exposure begins and the time that the exposure ends. FIG. 4A shows an embodiment where the exposure 405 of array B begins after the exposure 410 of array A begins, and the exposure 405 of array B ends before the exposure 410 of array A ends. In this way, the exposure 410 of pixel array B is centered with respect to the exposure 405 of pixel array A, or, put another way, the exposure of array A "windows" the exposure of array B. FIG. 4B shows an embodiment where the exposure 415 of array B begins at about the same time as the exposure 420 of array A begins, and the exposure 415 of array B ends before the exposure 420 of array A ends. The different exposures allow the best parts of the image from array A to be combined with the best parts of the image from array B. If the image from array A is the desired image, but the image contains areas that are overexposed, the image from array B provides areas for replacement through image blending. If the image from array B is the desired image, but the image contains areas that are underexposed, the image from array A provides areas for replacement through blending.

Blending can be done on a computer using existing software packages. In some embodiments, the apparatus 200 in FIG. 2 includes a memory circuit to store image information obtained from pixel array A and image information obtained from pixel array B. In some embodiments, the image from array A is stored as one file in the memory circuit and the image from array B is stored as a second file. In some embodiments, blending is done after reading the image information from the memory circuit into a computer. In some embodiments, the control logic circuit 220 includes a microprocessor, and blending is accomplished within the apparatus. According to some embodiments, the control logic circuit 220 includes programmable logic to independently determine the exposure of the pixel arrays. In some embodiments, the control logic circuit 220 is operable to determine the commencement of the exposure, or the duration of the exposure, or both the commencement and duration of the exposure of the pixel array B in relation to the duration of the exposure of pixel array A. In some embodiments, the control logic circuit 220 is operable to place a delay between commencement of the exposure of pixel array A and commencement of the exposure of pixel array B. In some embodiments, the exposures are determined according to a desired light intensity, or luminance, of at least some of the pixels in the arrays, and can be set manually by a camera user or the exposures can be determined by the control logic circuit 220.

Figure 4C:
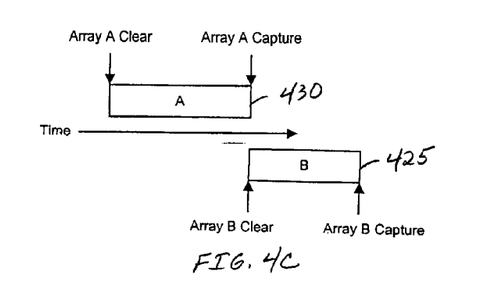
Figure 4D:
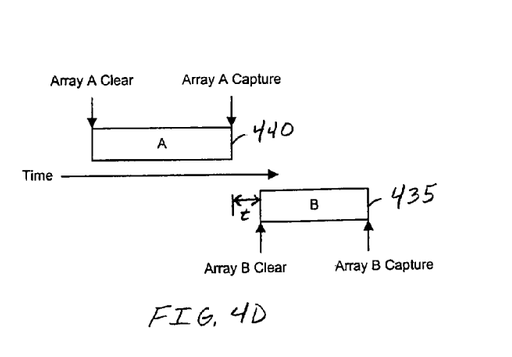

FIG. 4C shows an embodiment where the beginning of the exposure 425 of array B occurs at about the same time as the end of the exposure 430 of array A. FIG. 4D shows an embodiment where a delay t is placed between the end of the exposure 440 of array A and the beginning of the exposure 435 of array B.

According to some embodiments, the apparatus 200 in FIG. 2 includes a photo flash control circuit coupled to the control logic circuit 220. In the embodiments, the commencement of the exposure, or the duration of the exposure, or both the commencement and duration of the exposure of at least pixel array A is determined in relation to an illumination of a flash. When a flash is used, the embodiments of exposure in FIGS. 4C and 4D are especially useful. In FIG. 4C, the exposure of array A is taken without a flash. The flash occurs during the exposure of array B. Any overexposed areas in the image taken with the flash (i.e. array B) can be replaced with areas of the image from array A. Because the exposures take place closely in time to each other, problems due to movement in a scene from the first exposure to the second are minimized. Additionally, if the "red-eye" effect occurs from the flash during the second exposure, the red-eye of the subject can be replaced with the "normal-eye" image from the first exposure. A discussion of combining the best portions of flash and no-flash image pairs into one image using digital photography is found in Petschnigg et al., "Digital Photography with Flash and No-Flash Image Pairs," *Proceedings of SIGGRAPH* 2004.

Alternatively, the exposure times of array A and array B could be transposed and the flash image taken first. However, in some flash designs it is difficult to control the amount of light generated by the flash because once the flash is triggered it continues to provide illumination to the scene until the flash finishes. In some embodiments, some degree of control over the flash can be given by terminating the exposure process once a predetermined exposure time takes place (such as $\frac{1}{60}^{th}$ of a second) even though the flash continues to generate light in the scene. A delay is then timed to allow the flash circuit to run its course before the non-flash image is captured. In some embodiments, the apparatus 200 shuts down the flash circuit after the exposure time. A delay is then timed to allow the light in the scene to return to ambient light before the non-flash image is captured.

Because of the speed of a flash in comparison to the speed of exposure of an image sensor, the illumination of a scene to light from a flash can be thought of as a gradual increase from ambient light to full illumination. In this case, exposures of pixel arrays A and B such as those shown in FIG. 4D are useful. Pixel array A is used to capture an image of the scene in ambient light. Illumination of the flash begins after the exposure of array A ends. Delay t is timed while the flash increases the amount of light in the scene. Pixel array B is used to capture an image of the scene when it is in full illumination from the flash. It should be noted that, in contrast to what is shown in FIG. 4D, delay t may be longer in duration than the exposure of array A, or array B, or both. In some embodiments, the control logic circuit determines the exposure times of the pixel arrays and the delay t from settings for the flash.

A person of skill in the art would understand upon reading this detailed description that logical and temporal changes to the embodiments shown in the Figures are within the contemplation of this document. For example, the embodiments shown in FIGS. 3A-3D and FIGS. 4A-4D are not limited to only two pixel arrays on an image sensor, but are applicable to image sensors that include more than two arrays.

Figure 3E:
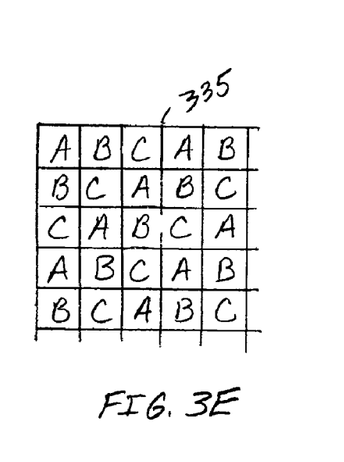
Figure 4E:
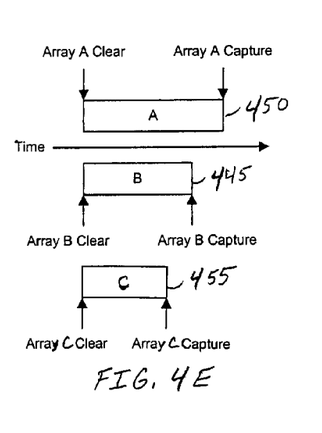

As an illustrative example, FIG. 3E shows an embodiment of an image sensor 335 with pixels of a third array, array "C," interspersed with the pixels of arrays A and B. FIG. 4E shows a timing diagram that represents exposure for three pixel arrays. The exposure 455 of Array C can be different from the exposure 445, 450 of arrays B and A, or the exposure 455 may be the same as one or both of the exposure durations 445, 450. In some embodiments, the control logic circuit is operable to determine the exposure durations of the three arrays. In some embodiments, the exposures can be set manually.

In some embodiments, the exposure 455 of array C has a shorter duration than the exposure 445 of array B which has a shorter duration than the exposure 450 of array A. This provides for bracketing of the exposure of the image from array B with the exposures of the image from arrays A and C, similar to the bracketing technique from film photography discussed previously. Embodiments where the exposure 455 of array C is the same as one or both of the exposures 445, 450 are useful for such things as capturing higher resolution images or combinations of higher resolution images simultaneously with images of different exposures.

Figure 5:
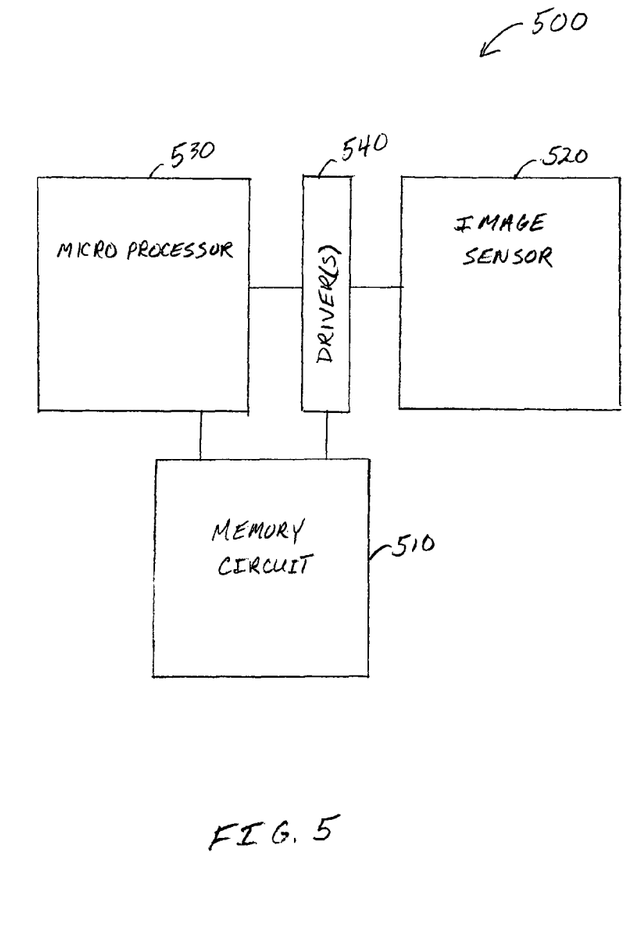
FIG. 5 shows a block diagram of an embodiment of portions of a system for improving the exposure range of image sensors.

FIG. 5 shows a block diagram of an embodiment of portions of a system 500 that includes a memory circuit 510, an image sensor 520, and a microprocessor 530 coupled to the memory circuit 510 and the image sensor 520. In some embodiments, the memory circuit 510 includes a static random access memory (SRAM). In some embodiments, the memory circuit 510 includes a flash memory. In one illustrative example, the flash memory is a removably coupled flash memory, such as a removable memory card. In some embodiments, the memory circuit 510 includes a disk memory. The image sensor 520 provides image information to the memory circuit 510. In some embodiments, the system 500 includes one or more driver circuits 540 to transfer image information from the image sensor 520 into memory 510. In some embodiments, the memory 510 is removable. The image sensor 520 includes at least a first pixel array and a second pixel array with at least some of the pixels of the first pixel array interspersed with pixels of the second pixel array. In some embodiments, pixels of the first pixel array and pixels of the second pixel array are interspersed on the image sensor in a checkerboard arrangement. In some embodiments, at least one pixel of the first or second pixel arrays is a color pixel that is comprised of a plurality of monochrome pixels with individual color filters. At least one pixel array of the image sensor 520 can be exposed to an image differently than the other pixel array or arrays.

The microprocessor 530 provides control of exposures of the pixel arrays to the image or scene. According to some embodiments, the microprocessor 530 is operable to combine image information obtained from the different pixel arrays. The microprocessor 530 is operable through execution of instructions embodied in hardware, firmware, software, or combinations including hardware, firmware, or software. In some embodiments combining image information includes replacing empty pixels, or saturated pixels, or both, with image information from an adjacent pixel location. The adjacent pixel location can be any adjacent pixel location where the corresponding pixel or pixels are not empty or saturated. In some embodiments, the information from adjacent pixel clusters is combined. In some embodiments, combining image information includes replacing or discarding empty or fully saturated pixels. In some embodiments, combining image information includes averaging pixel values, such as averaging the quantized value of adjacent pixels or pixel clusters. In some embodiments program code for the microprocessor 530 to execute embodiments of methods of combining image information is included in a computer readable storage medium. In some embodiments, image information from the different arrays is stored in separate files. In some embodiments, the image information from the different arrays is stored as one file. In some of the embodiments, post-processing on the files separates the pixels of the different arrays. This post-processing can be done by either the microprocessor 530 or a computer after downloading the image information.

In some embodiments, the system 500 includes a flash control circuit coupled to the microprocessor 530. The microprocessor 530 is operable to determine the commencement of the exposure, or the duration of the exposure, or both the commencement and duration of an exposure of at least one pixel array in relation to an illumination of a flash. In some embodiments, the microprocessor 430 determines exposure settings from flash setting information.

According to some embodiments, the system 500 further includes a video connection, such as a Firewire connection for example. In some embodiments, the memory circuit 510 functions as a buffer for the image information from the different arrays. The image information can be processed "on the fly" as it is transmitted over the Firewire connection.

Figure 6:
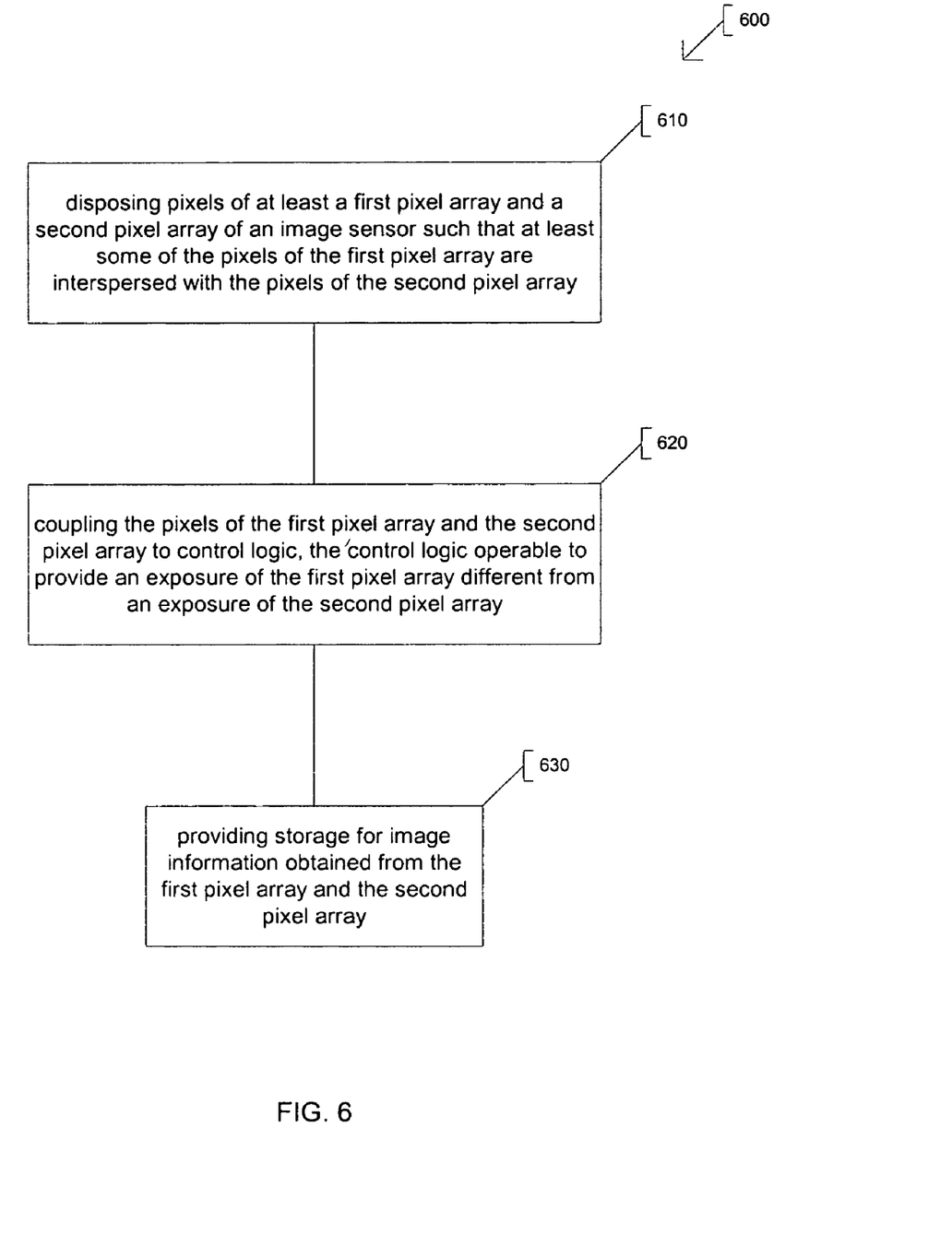
FIG. 6 shows an embodiment of a method for improving the exposure range of image sensors.

FIG. 6 shows an embodiment of a method 600 for improving the range of exposure of image sensors. At 610, pixels of at least a first pixel array and a second pixel array of an image sensor are formed such that at least some of the pixels of the first pixel array are interspersed with the pixels of the second pixel array. In some embodiments, forming pixel arrays includes interspersing pixels of the first pixel array and the second pixel array in an alternating arrangement. In some embodiments, forming pixel arrays includes interspersing pixels of the first pixel array and the second pixel array in a checkerboard arrangement.

At 620, the pixels of the first pixel array and the second pixel array are coupled to control logic. The control logic is operable to allow an exposure of the first pixel array to an image to be different from an exposure of the second pixel array to the image. Control logic includes hardware circuits performing logic functions. Control logic also includes a microprocessor executing instructions in software or firmware. Control logic further includes combinations of hardware, software, or firmware performing logic functions.

In some embodiments, the control logic is operable to allow the exposure of the first pixel array to begin before the exposure of the second pixel array begins. In some embodiments, the control logic is operable to allow the exposure of the first pixel array to end before the exposure of the second pixel array ends. In some embodiments, the control logic is operable to allow the exposure of the first pixel array to bracket the exposure of the second array. In some embodiments, the control logic is operable to allow the exposure of the first pixel array to end before the exposure of the second pixel array begins. In some embodiments, the control logic is operable to allow a duration of time to occur between the exposure of the first pixel array and the exposure of the second pixel array.

According to some embodiments, the control logic is operable to allow the exposure of at least the first pixel array to occur in relation to an illumination of a flash. In some embodiments, the control logic is operable to allow the exposure of the first pixel array to occur before the flash begins and the exposure of the second array to occur during the flash.

At 630 of FIG. 6, storage is provided for image information obtained from the first pixel array and the second pixel array. In some embodiments, providing storage for image information includes providing storage for combined image information obtained from the first pixel array and the second pixel array.

Providing multiple images of a scene subject to different exposures allows photographers to expand the dynamic range of images captured with digital image sensors. Photographers combine the best parts of the multiple images to create an image beyond the dynamic range of individual image sensor pixel arrays without the limitations from movement of the scene.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually, collectively, or both by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. An apparatus comprising:
an image sensor including at least a first pixel array and a second pixel array, wherein at least some pixels of the first pixel array are interspersed over an image sensing area with pixels of the second pixel array, wherein the first and second pixel array comprise different color pixels; and
a control logic circuit operable to capture a first multi-color image with only the pixels of the first pixel array using a first exposure duration and capture a second multi-color image at substantially the same time with only the pixels of the second pixel array using a second exposure duration, wherein at least a portion of the pixels of one pixel array are replaceable with pixels of the other pixel array to produce a third multi-color image.

2. The apparatus of claim 1, wherein pixels of the first pixel array and pixels of the second pixel array are interspersed on the image sensor in an alternating arrangement.

3. The apparatus of claim 1, wherein pixels of the first pixel array and pixels of the second pixel array are interspersed on the image sensor in a checkerboard arrangement.

4. The apparatus of claim 1, wherein the control logic circuit is operable to determine the commencement of the exposure of the second pixel array, or the duration of the exposure of the second pixel array, or both, in relation to the exposure of the first pixel array.

5. The apparatus of claim 1, wherein the control logic circuit includes programmable logic to independently determine the exposure of the first and second pixel arrays.

6. The apparatus of claim 5, wherein the control logic determines the exposure of the first and second pixel arrays based on a desired luminance of at least some pixels.

7. The apparatus of claim 1, wherein the control logic circuit is operable to place a delay between the commencement of the exposure of the first pixel array and the commencement of the exposure of the second pixel array.

8. The apparatus of claim 7, wherein the exposure of the second pixel array is centered within the exposure of the first pixel array.

9. The apparatus of claim 1 further including a flash control circuit coupled to the control logic circuit, wherein the commencement of the exposure, or the duration of the exposure, or both, of at least the first pixel array are determined in relation to an illumination of a flash.

10. The apparatus of claim 1, wherein at least one pixel of the first or second pixel arrays is a color pixel comprised of a plurality of monochrome pixels.

11. The apparatus of claim 1, further including a memory circuit to store image information obtained from the first pixel array and image information obtained from the second pixel array.

12. The apparatus of claim 1, wherein the at least a first pixel array and a second pixel array includes three or more pixel arrays, wherein the pixels of at least a third pixel array are interspersed with the pixels of the first and second pixel arrays, wherein the third pixel array is operable to have an exposure different from the first or second pixel arrays, and wherein the control logic circuit is operable to determine the exposure of the first, second and third pixel arrays.

13. The apparatus of claim 12, wherein the control logic is operable to expose the first pixel array to an image for a longer time than the second pixel array, and to expose the third pixel array to an image for a shorter time than the second pixel array.

14. A system comprising:
a memory circuit, the memory circuit including a removably coupled flash memory;
an image sensor to provide image information to the memory circuit, the image sensor including at least a first pixel array and a second pixel array, wherein the first and second pixel array comprise different color pixels and at least some pixels of the first pixel array are interspersed with pixels of the second pixel array, and wherein the first pixels of the first pixel array can be exposed to an image differently than the pixels of the second pixel array can be exposed to the image; and
a microprocessor coupled to the memory circuit and the image sensor operable to capture a first multi-color image using only the pixels of the first pixel array using a first exposure duration and capture a second multi-color image using only the pixels of the second pixel array at substantially the same time using a second exposure duration, wherein at least a portion of the pixels of one pixel array are replaceable with pixels of the other pixel array to produce a third multi-color image.

15. The system of claim 14, wherein the microprocessor is operable to combine image information obtained from the at least first pixel array and second pixel array.

16. The system of claim 15, wherein combining image information includes replacing empty pixels, or saturated pixels, or both, with image information from an adjacent pixel location where the corresponding adjacent pixel is not empty or saturated.

17. The system of claim 14 further including a flash control circuit coupled to the microprocessor, wherein the microprocessor determines an exposure of at least the first pixel array in relation to an illumination of a flash.

18. The system of claim 14, wherein pixels of the first pixel array and pixels of the second pixel array are interspersed on the image sensor in a checkerboard arrangement.

19. The system of claim 14, wherein at least one pixel of the first or second pixel arrays is a color pixel, and wherein the color pixel is comprised of a plurality of monochrome pixels.

20. A method comprising:
forming at least a first pixel array and a second pixel array of an image sensor such that at least some pixels of the first pixel array are interspersed with pixels of the second pixel array, wherein the first and second pixel array comprise different color pixels;
coupling the pixels of the first pixel array and the second pixel array to control logic, the control logic operable to capture a first multi-color image using only the pixels of the first pixel array using a first exposure duration and capture a second multi-color image using only the pixels of the second pixel array at substantially the same time using a second exposure duration, wherein at least a portion of the pixels of one pixel array are replaceable with pixels of the other pixel array to produce a third multi-color image; and
providing first storage for image information obtained from the first pixel array and second storage for image information obtained from the second pixel array.

21. The method of claim 20, wherein interspersing pixels includes interspersing pixels of the first pixel array and the second pixel array in an alternating arrangement.

22. The method of claim 20, wherein interspersing pixels includes interspersing pixels of the first pixel array and the second pixel array in a checkerboard arrangement.

23. The method of claim 20, wherein the control logic is operable to allow the exposure of the first pixel array to begin before the exposure of the second pixel array begins.

24. The method of claim 20, wherein the control logic is operable to allow the exposure of the first pixel array to end before the exposure of the second pixel array ends.

25. The method of claim 20, wherein the control logic is operable to allow the exposure of the first pixel array to bracket the exposure of the second array.

26. The method of claim 20, wherein the control logic is operable to allow the exposure of the first pixel array to end before the exposure of the second pixel array begins.

27. The method of claim 20, wherein the control logic is operable to allow a duration of time to occur between the exposure of the first pixel array and the exposure of the second pixel array.

28. The method of claim 20, wherein the control logic is operable to allow the exposure of at least the first pixel array to occur in relation to an illumination of a flash.

29. The method of claim 28, wherein the control logic is operable to allow the exposure of the first pixel array to occur before the flash begins and the exposure of the second array to occur during the flash.

30. The method of claim 20, the method of claim 1, wherein providing storage for image information includes providing storage for combined image information obtained from the first pixel array and the second pixel array.

31. A computer readable storage medium including program code for a microprocessor to execute embodiments of a method comprising:
exposing pixels of at least one pixel array and pixels of another pixel array to an image, wherein the first and second pixel array comprise different color pixels and at least some of the pixels of the one pixel array are interspersed with pixel clusters of the other pixel array, and wherein only pixels of the one pixel array are exposed to an image using a first exposure duration to obtain a first captured multi-color image and only pixels of the other pixel array are exposed to the image at substantially the same time using a second exposure duration to obtain a second captured multi-color image; and
combining image information obtained from the pixel arrays, wherein at least a portion of the pixel clusters of one pixel array are replaceable with pixel clusters of the other pixel array to produce a third multi-color image.

32. The computer readable storage medium of claim 31, further including program code for replacing empty pixels, or saturated pixels, or both, from one pixel array with image information from adjacent pixel locations of another pixel array where the corresponding adjacent pixel is neither empty nor saturated.

33. The computer readable storage medium of claim 31, wherein the pixel arrays include pixel clusters, at least some of adjacent pixel clusters of the one pixel array are interspersed with pixel clusters of the other pixel array, and wherein combining image information includes combining image information from adjacent pixel clusters of the one and the other pixel arrays.

* * * * *